W. C. McGill,
Flour Sieve.

Nº 54,575.         Patented May 8, 1866.

Witnesses:                      Inventor:
W. C. McGill

UNITED STATES PATENT OFFICE.

WILLIAM C. McGILL, OF CINCINNATI, OHIO.

IMPROVED FLOUR-SIFTER.

Specification forming part of Letters Patent No. 54,575, dated May 8, 1866.

*To all whom it may concern:*

Be it known that I, WILLIAM C. McGILL, of Cincinnati, Hamilton county, Ohio, have invented a new and useful Flour-Sifter; and I do hereby declare the following to be a full, clear, and exact description thereof, reference being had to the accompanying drawings, making part of this specification.

My invention relates to a provision for the rapid sifting of flour or meal for domestic use, comprising a pair of sweeps or scrapers adapted to be rotated continuously over a suitable sieve confined within a close box or hopper, which may be set upon the pastry-board or table on which the viands are to be prepared, thus avoiding wastage, dust, &c.

Figure 1:
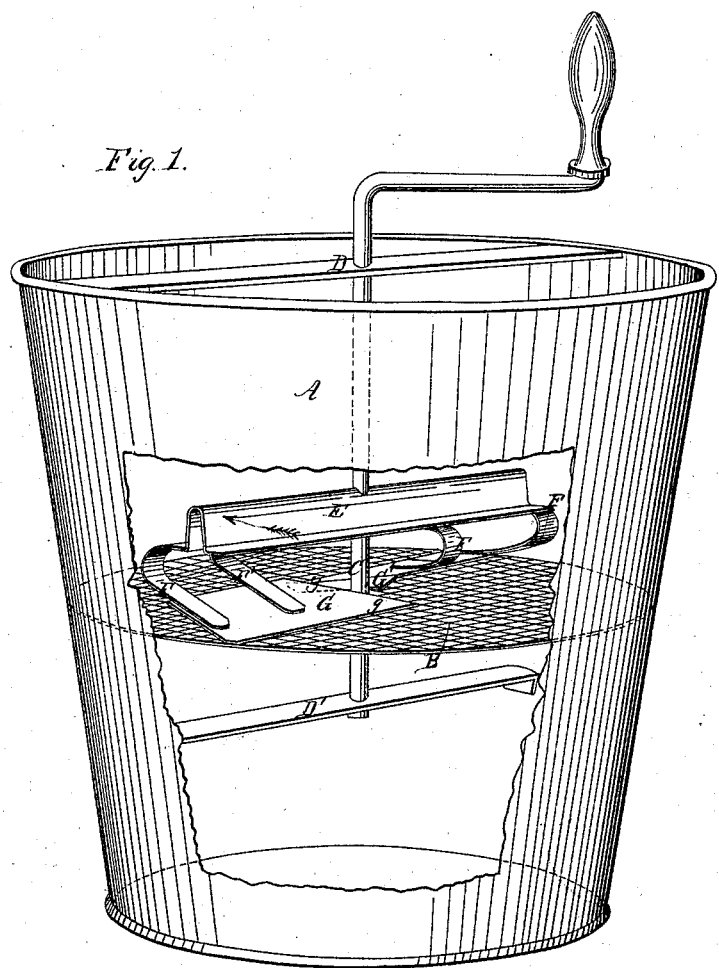
Figure 2:
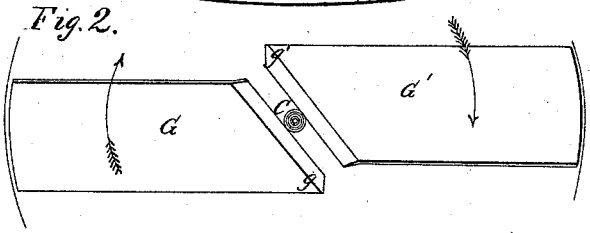

Figure 1 is a perspective view of a sifter embodying my improvements. Fig. 2 is a plan of the scrapers.

A is a box or hopper in the form of a cylinder or inverted conic frustrum, which may be open at both ends.

B is a sieve of wire-gauze or other suitable material. C is a shaft supported at the axis of the hopper in bridges D and D', and having a horizontal arm, E, from whose under side there project springs F. To the lower ends of the springs F, I attach in an oblique position two blades, G G', of trapezoidal form, their acute angles $g$ $g'$ projecting past the shaft and in front thereof in the manner represented, so as to completely sweep the entire surface of the sieve.

By making the arm E of the peculiar form represented its elasticity is added to that of the springs, and it also serves to agitate and loosen the flour or meal preparatory to the action of the blades or scrapers G G'.

The upper end of the shaft C terminates in a crank or handle, $c$.

I claim herein as new and of my invention—

In the described combination with the box or case A and sieve B, the scrapers G $g$ G' $g'$, springs F, elastic arm E, shaft C, and crank $c$, arranged and operating substantially as and for the purpose herein set forth.

In testimony of which invention I hereunto set my hand.

W. C. McGILL.

Witnesses:
 GEO. H. KNIGHT,
 JAMES H. LAYMAN.